United States Patent
Taniguchi (10) Patent No.: US 11,652,836 B2
(45) Date of Patent: May 16, 2023

(54) NON-TRANSITORY COMPUTER-READABLE STORAGE MEDIUM, DETECTION METHOD, AND INFORMATION PROCESSING DEVICE

(71) Applicant: FUJITSU LIMITED, Kawasaki (JP)

(72) Inventor: Tsuyoshi Taniguchi, Katsushika (JP)

(73) Assignee: FUJITSU LIMITED, Kawasaki (JP)

( * ) Notice: Subject to any disclaimer, the term of this patent is extended or adjusted under 35 U.S.C. 154(b) by 192 days.

(21) Appl. No.: 17/129,323

(22) Filed: Dec. 21, 2020

(65) Prior Publication Data
US 2021/0211448 A1    Jul. 8, 2021

(30) Foreign Application Priority Data
Jan. 6, 2020  (JP) .............................. JP2020-000363

(51) Int. Cl.
*H04L 29/06* (2006.01)
*H04L 9/40* (2022.01)
(Continued)

(52) U.S. Cl.
CPC ...... *H04L 63/1425* (2013.01); *G06F 16/9538* (2019.01); *H04L 61/5007* (2022.05)

(58) Field of Classification Search
CPC ............. H04L 63/1425; H04L 61/5007; G06F 16/9538
See application file for complete search history.

(56) References Cited

U.S. PATENT DOCUMENTS 8,260,914 B1    9/2012  Ranjan
2004/0083306 A1    4/2004  Gloe
(Continued)

FOREIGN PATENT DOCUMENTS

CN    108282786 B    10/2020
JP    2009-212693 A    9/2009
(Continued)

OTHER PUBLICATIONS

Leyla Bilge et al., "Exposure: Finding Malicious Domains Using Passive DNS Analysis", NDSS, 2011 (Total 17 pages).
(Continued)

*Primary Examiner* — Christopher B Robinson
(74) *Attorney, Agent, or Firm* — Fujitsu Patent Center (57) ABSTRACT

A non-transitory computer-readable storage medium storing a detection program that causes a processor included in a noise estimation apparatus to execute a process, the process includes acquiring domain information included in cyber attack information, acquiring record information corresponding to the acquired domain information from a second managing server, the second managing server managing a response history of a first managing server by monitoring communication of the first managing server, the first managing server managing an association between domain information and an IP address, the response history being related to the association between the domain information and the IP address, identifying an IP address that is repeatedly used and a name server associated with the identified IP address by analyzing the record information, and outputting first list information indicating the identified IP address and the identified name server.

9 Claims, 9 Drawing Sheets

(51) Int. Cl.
  *G06F 16/9538* (2019.01)
  *H04L 61/5007* (2022.01)

(56) References Cited

U.S. PATENT DOCUMENTS

| | | | | |
|---|---|---|---|---|
| 2012/0054869 | A1* | 3/2012 | Yen | H04L 63/1441 |
| | | | | 709/245 |
| 2016/0080319 | A1* | 3/2016 | Steele | H04L 61/2517 |
| | | | | 709/228 |
| 2017/0195439 | A1* | 7/2017 | Dixon | H04L 61/5007 |
| 2019/0387005 | A1* | 12/2019 | Zawoad | H04L 63/1408 |

FOREIGN PATENT DOCUMENTS

| | | |
|---|---|---|
| JP | 2018-120308 A | 8/2018 |
| KR | 10-2017-0046000 A | 4/2017 |

OTHER PUBLICATIONS

Florian Weimer, "Passive DNS Replication", First conference on Computer Security Incident, Jul. 30, 2004, pp. 1-14 (Total 14 pages).

Shuang Hao et al., "Predator: Proactive Recognition and Elimination of Domain Abuse at Time-Of-Registration", Proceedings of the 2016 ACM SIGSAC Conference on Computer and Communications Security, ACM, 2016 (Total 12 pages).

Great Britain Search Report dated Apr. 8, 2021 for corresponding Great Britain Patent Application No. 2020145.5, 3 pages.

\* cited by examiner

| MALICIOUS NAME SERVER | IP ADDRESS |
|---|---|
| ns1.malicious.com | a.a.a.a |
| | b.b.b.b |
| | ... |
| ... | ... |

| REUSED MALICIOUS IP ADDRESS | MALICIOUS NAME SERVER |
|---|---|
| a.a.a.a | ns1.malicious.com |
| | ns2.malicious.com — 22 |
| | ns1.bad.com |
| | ... |
| ... | ... |

NON-TRANSITORY COMPUTER-READABLE STORAGE MEDIUM, DETECTION METHOD, AND INFORMATION PROCESSING DEVICE

CROSS-REFERENCE TO RELATED APPLICATION

This application is based upon and claims the benefit of priority of the prior Japanese Patent Application No. 2020-363, filed on Jan. 6, 2020, the entire contents of which are incorporated herein by reference.

FIELD

The embodiments discussed herein are related to a non-transitory computer-readable storage medium, a detection method, and an information processing device.

BACKGROUND

In recent years, in large attack infrastructure systematically built on a global scale, various cyber attacks have been made and large damage has occurred. There is a growing tendency for criminal organizations to systematically operate attack infrastructure on a large scale and provide environments for cyber attacks as business.

The attack infrastructure of domains used for the cyber attacks and the like is identified and taken down for fundamental defense against the cyber attacks. To handle the cyber attacks, it is important to identify the attack infrastructure to be taken down.

As an existing technique for identifying attack infrastructure, a technique is known, which acquires IP address-related information on IP addresses corresponding to multiple domain names, calculates a similarity of IP address-related information of domain names among the multiple domain names, and generates a set of the domain names based on the similarity as a set of domain names operated in the same Botnet.

Related art is disclosed in for example Japanese Laid-open Patent Publication No. 2018-120308

SUMMARY

According to an aspect of the embodiments, a non-transitory computer-readable storage medium storing a detection program that causes a processor included in a noise estimation apparatus to execute a process, the process includes: acquiring domain information included in cyber attack information; acquiring record information corresponding to the acquired domain information from a second managing server, the second managing server managing a response history of a first managing server by monitoring communication of the first managing server, the first managing server managing an association between domain information and an IP address, the response history being related to the association between the domain information and the IP address; identifying an IP address that is repeatedly used and a name server associated with the identified IP address by analyzing the record information; and outputting first list information indicating the identified IP address and the identified name server.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Attack infrastructure systematically operated on a large scale uses a large number of zombie computers to hide an actual command and control (C & C) server and avoid the taking down of the attack infrastructure using a method, for example, Fast Flux. For example, the attack infrastructure, which switches an IP address for a domain within a short time period or discards the domain and in which even an authoritative name server for domain registration is embedded for the operation, is skillfully operated. Therefore, it is not easy for the existing technique to detect the attack infrastructure.

According to an aspect, an object is to provide a detection program, a detection method, and an information processing device that may support the identification of attack infrastructure used for cyber attacks.

A detection program, a detection method, and an information processing device according to an embodiment are described below with reference to the drawings. Configurations that have the same function are indicated by the same reference sign, and duplicate description is omitted. The detection program, the detection method, and the information processing device that are described in the following embodiment are merely an example and do not limit the embodiment. The following embodiments may be appropriately combined so as not to cause contradiction.

(Regarding Overview)

Many studies have been proposed to detect an unidentified malicious domain used for a cyber attack. As proposed methods for detecting an unidentified malicious domain, "Bilge, Leyla, et al. "EXPOSURE: Finding Malicious Domains Using Passive DNS Analysis." Ndss. 2011.", and "Weimer, Florian. "Passive DNS replicaton." FIRST conference on computer security incident. 2005" that is related to Passive DNS (Domain Name System) are known.

An exposure system selects 4 types of features, time-based features, DNS answer-based features, TTL value-based features, and domain name-based features as features to be used to detect a malicious domain, learns an identifying device based on data of Passive DNS, and verifies an effect using large data. Passive DNS replication includes a detailed description about a method for building Passive DNS.

A method for detecting a malicious domain based on a behavior for registration of a domain based on WHOIS data has been proposed, like "Hao, Shuang, et al. "PREDATOR: proactive recognition and elimination of domain abuse at time-of-registration." Proceedings of the 2016 ACM SIGSAC Conference on Computer and Communications Security. ACM, 2016.". This proposed method may select 22 features related to 3 categories, domain profile features, registration history features, and batch correlation features. The proposed method may detect a spam-related malicious domain mainly based on a change in an IP address of a name server or information that is held in a registrar or the like and in which a domain is registered in multiple name servers at the moment when the spam-related malicious domain is registered.

When attack infrastructure, which switches an IP address for a domain within a short time period or discards the domain and in which even an authoritative name server for domain registration is embedded for the operation, is skillfully operated, it is not easy to identify the attack infrastructure by any of the foregoing proposed methods.

In the embodiment, some of malicious domains that are used for cyber attacks systematically made on a large scale serve as seeds, some of IP addresses (repeatedly used) used as cores for the malicious domains are detected, and a malicious name server is detected.

For example, in attack infrastructure systematically operated on a large scale, while a large number of IP addresses are discarded, some of IP addresses are reused, Therefore, by detecting an IP address (repeatedly used) used as a core in the attack infrastructure, an unidentified domain and an unidentified name server that have been newly added to the attack infrastructure are detected.

For example, in the detection of a malicious domain, it may be difficult to identify an operational difference between a normal domain for which a content delivery network service is used and a malicious domain for which Fast Flux is used. However, since it is rare that the name server is operated such that an IP address of the name server is frequently changed, the name server is easily identified. The name server is operated using a stable IP address limited for the name server in a systematic operation in many cases.

Therefore, it is possible to efficiently detect the name server (malicious name server) operated by an attacker in the attack infrastructure systematically built on a large scale, based on some IP addresses frequently used. Since the unidentified malicious domain registered in the detected malicious name server may be simultaneously detected, the detection may be efficiently achieved. By taking down the attack infrastructure for the malicious name server and the malicious domain that have been detected (identified) in the foregoing manner, fundamental defense against cyber attacks may be achieved.

Regarding Embodiment

Figure 1:
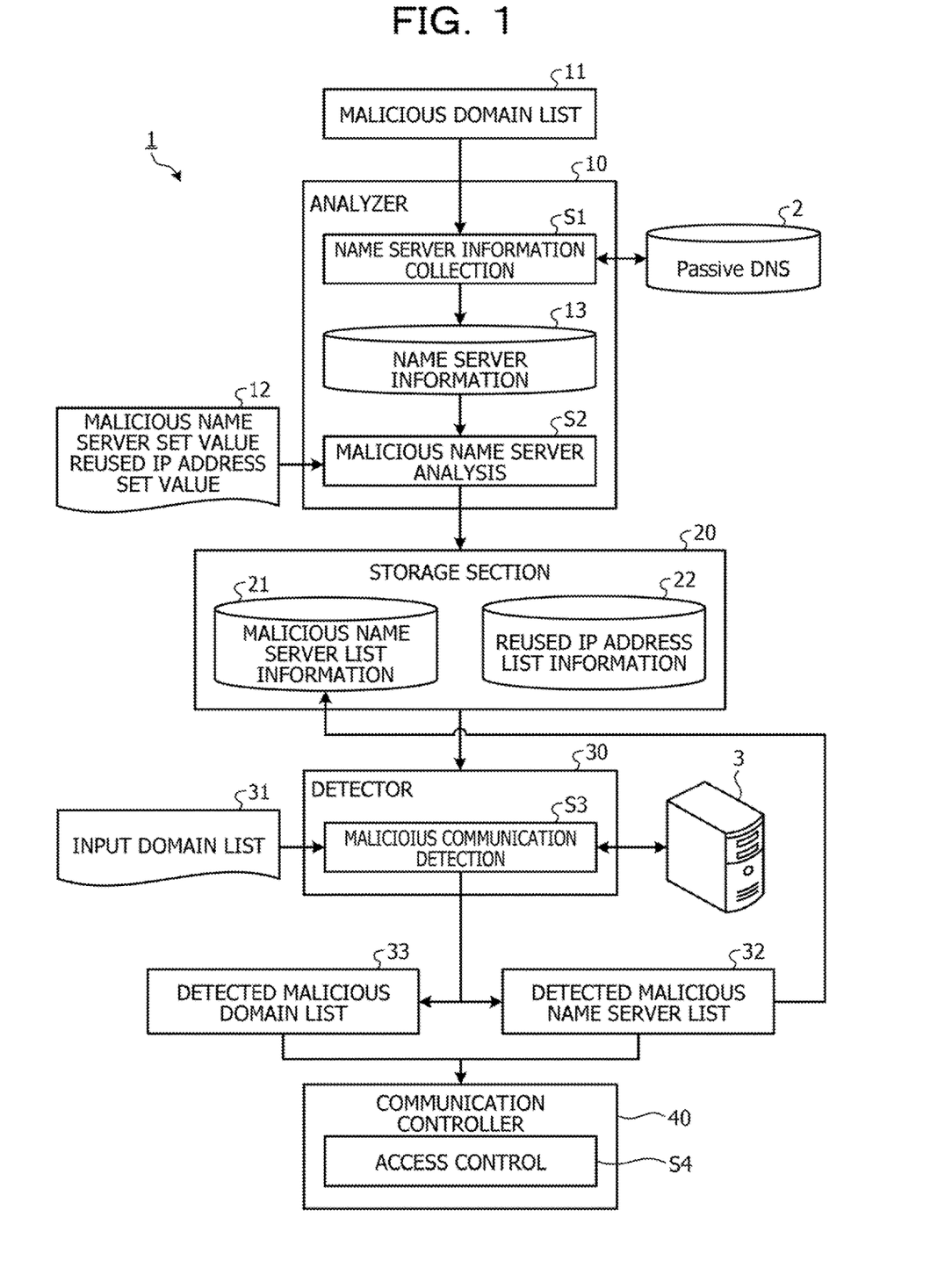
FIG. 1 is a block diagram illustrating an example of a functional configuration of an information processing device according to an embodiment.

FIG. 1 is a block diagram illustrating an example of a functional configuration of an information processing device according to an embodiment. The information processing device 1 according to the embodiment is, for example, a computer, such as a personal computer (PC).

As illustrated in FIG. 1, the information processing device 1 includes an analyzer 10, a storage section 20, a detector 30, and a communication controller 40.

The analyzer 10 acquires, as input, a malicious domain list 11 downloaded from a reputation site or the like and related to domains (malicious domains) systematically operated for cyber attacks. The malicious domain list 11 is a list of domain information (for example, domain names related to malicious domains, such as "xxx.xxx.com" and "yyy.yyyy.org") on the enumerated malicious domains related to attack sources. The malicious domain list 11 is an example of "domain information included in cyber attack information".

For example, the analyzer 10 acquires the malicious domain list 11 by downloading from the reputation site or the like, input of a file by a user, or the like. For example, the analyzer 10 is an example of an acquirer.

The analyzer 10 executes a name server information collection process (S1) of collecting (acquiring), from Passive DNS2, record information corresponding to the domain information of the acquired malicious domain list 11.

Passive DNS2 captures a DNS packet returned by an authoritative DNS server, such as DNS3, without transferring a zone file. The authoritative DNS server manages associations between domain information and IP addresses. A basic idea is that Passive DNS2 extracts a resource record after the capturing. For example, Passive DNS2 is an example of a second managing server that monitors communication of DNS3 and manages a response history of DNS3, and the response history is related to an association between domain information and an IP address. DNS3 is an example of a first managing server.

Figure 2:
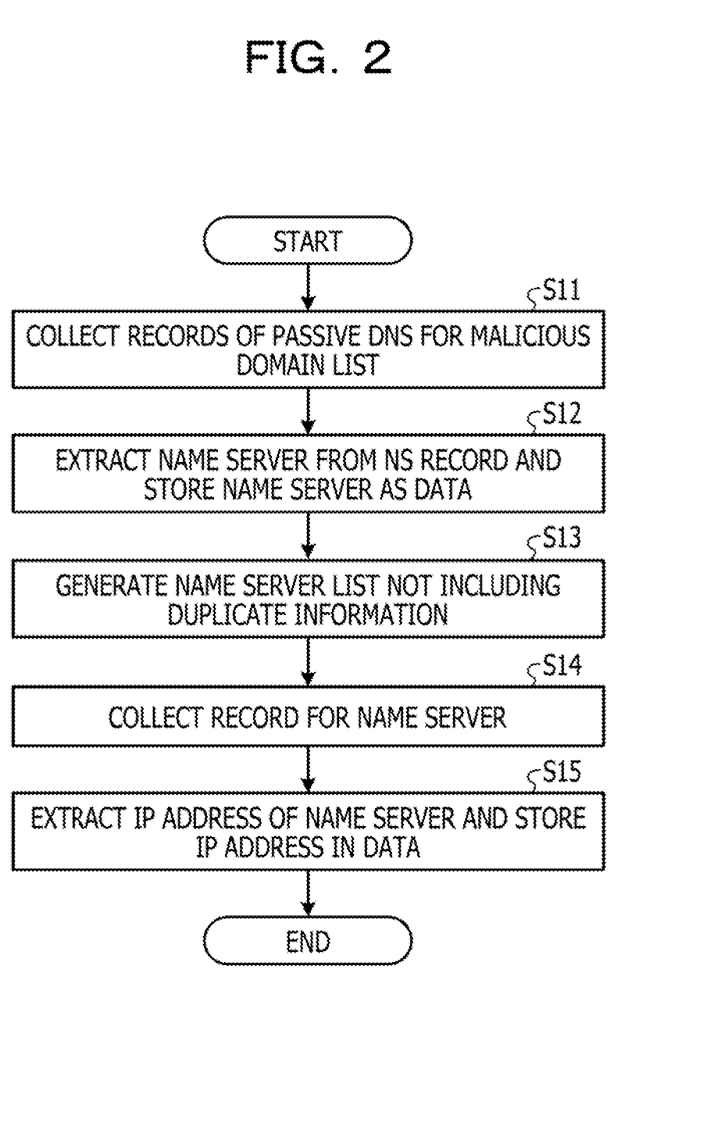
FIG. 2 is a flowchart illustrating an example of a name server information collection process.

FIG. 2 is a flowchart illustrating an example of the name server information collection process. As illustrated in FIG. 2, when the name server information collection process (S1) is started, the analyzer 10 uses a service provided by Passive DNS2 for the input malicious domain list 11 to collect records corresponding to the domain information of the malicious domain list 11 (S11).

As the prominent service related to Passive DNS2, DNSDB of Farsight Security Inc. or the like exists. For example, the analyzer 10 uses an application programming interface (API) provided for use of DNSDB to collect the records corresponding to the domain information.

The analyzer 10 extracts a name server from an NS record among the collected records and stores the extracted name server as data (malicious domain and name server information) of the name server corresponding to a malicious domain (S12).

A response (answer) from the DNS3 includes the NS record related to domain information of "malicious.com" such as indicating "malicious.com IN NS ns1.malicious.com" or the like, for example. The analyzer 10 extracts, from the NS record, the name server "ns1.malicious.com" corresponding to the malicious domain.

Figure 3:
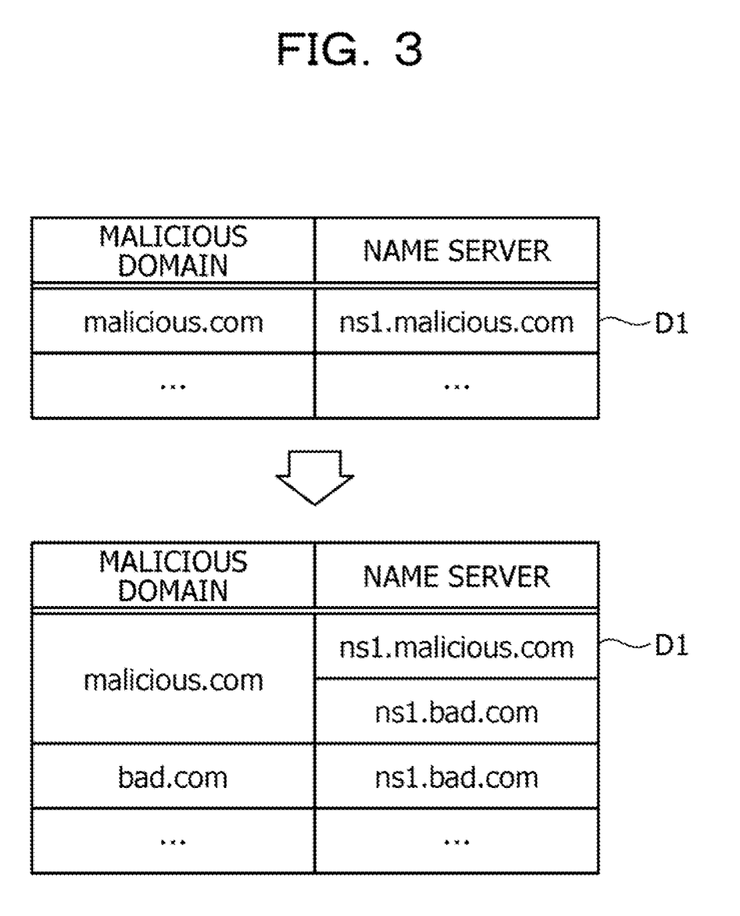
FIG. 3 is an explanatory diagram illustrating an example of malicious domain and name server information.

FIG. 3 is an explanatory diagram illustrating an example of the malicious domain and name server information. As illustrated in an upper part of FIG. 3, the analyzer 10 stores, as malicious domain and name server information D1, information of the name server extracted from the NS record and corresponding to the malicious domain. For example, for the foregoing NS record, the analyzer 10 stores "malicious.com" in a "malicious domain" column and "ns1.malicious.com" in a "name server" column.

A lower part of FIG. 3 exemplifies the malicious domain and name server information D1 in which all extracted information of name servers is stored. When multiple name servers are registered in one domain, like "malicious.com" in the malicious domain and name server information D1 illustrated in the lower part of FIG. 3, the analyzer 10 associates all the name servers with "malicious.com" and stores the name servers.

Return to FIG. 2. After S12, the analyzer 10 stores the malicious domain and name server information D1 on the malicious domain and the name server. After that, the analyzer 10 generates name server information 13 that is a list of the name server and does not include duplicate information (S13).

Figure 4:
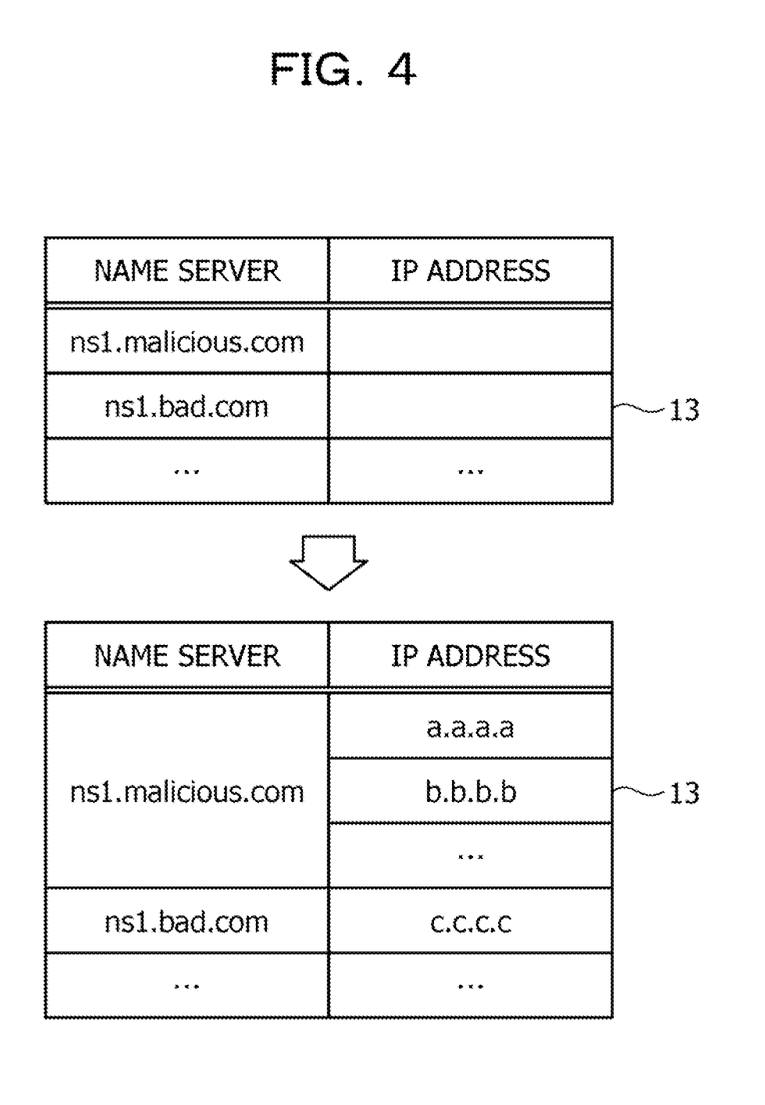
FIG. 4 is an explanatory diagram illustrating an example of server information.

FIG. 4 is an explanatory diagram illustrating an example of the name server information 13. As illustrated in an upper part of FIG. 4, the analyzer 10 references name servers of the malicious domain and name server information D1, stores the individual name servers in a "name server" column of the name server information 13, and generates a list of the name servers that does not include duplicate information.

Return to FIG. 2. After S13, the analyzer 10, based on the generated list of the name server, collect a record for the name server using the service of Passive DNS2 (S14). The analyzer 10 extracts an IP address of the name server from the collected record and stores the extracted IP address in data ("IP address" column of the name server information 13) (S15).

For example, the analyzer 10 extracts an IP address of a name server from an A record among the collected records. For example, the analyzer 10 extracts an IP address "a.a.a.a" of the name server "ns1.malicious.com" from the A record of "ns1.malicious.com IN A a.a.a,a". The analyzer 10 stores "a.a.a.a" in the "IP address" column and a row of "ns1.malicious.com" stored in the "name server" column in the name server information 13, as illustrated in a lower part of FIG. 4.

When multiple IP addresses are associated with a specific name server ("ns1.malicious.com" in the example illustrated in FIG. 4), the analyzer 10 extracts and stores all the IP addresses ("a.a.a.a", "b.b.b.b", . . . in the example illustrated in FIG. 4) associated with the specific name server.

Return to FIG. 1. The analyzer 10 executes a malicious name server analysis process (S2) of analyzing the record information (name server information 13) collected from Passive DNS2 and acquiring a malicious name server based on the record information.

For example, the analyzer 10 analyzes the record information collected from Passive DNS2 based on setting information 12 including a malicious name server set value and a reused IP address set value, and identifies IP addresses (reused IP addresses) repeatedly used and malicious name servers associated with the reused IP addresses. The analyzer 10 outputs reused IP address list information 22 of the identified reused IP addresses enumerated and malicious name server list information 21 of the identified malicious name servers enumerated. The output malicious name server list information 21 and the output reused IP address list information 22 are stored in the storage section 20.

For example, the analyzer 10 is an example of an identifying section and an output section. The malicious name server list information 21 and the reused IP address list information 22 are an example of first list information.

Figure 5:
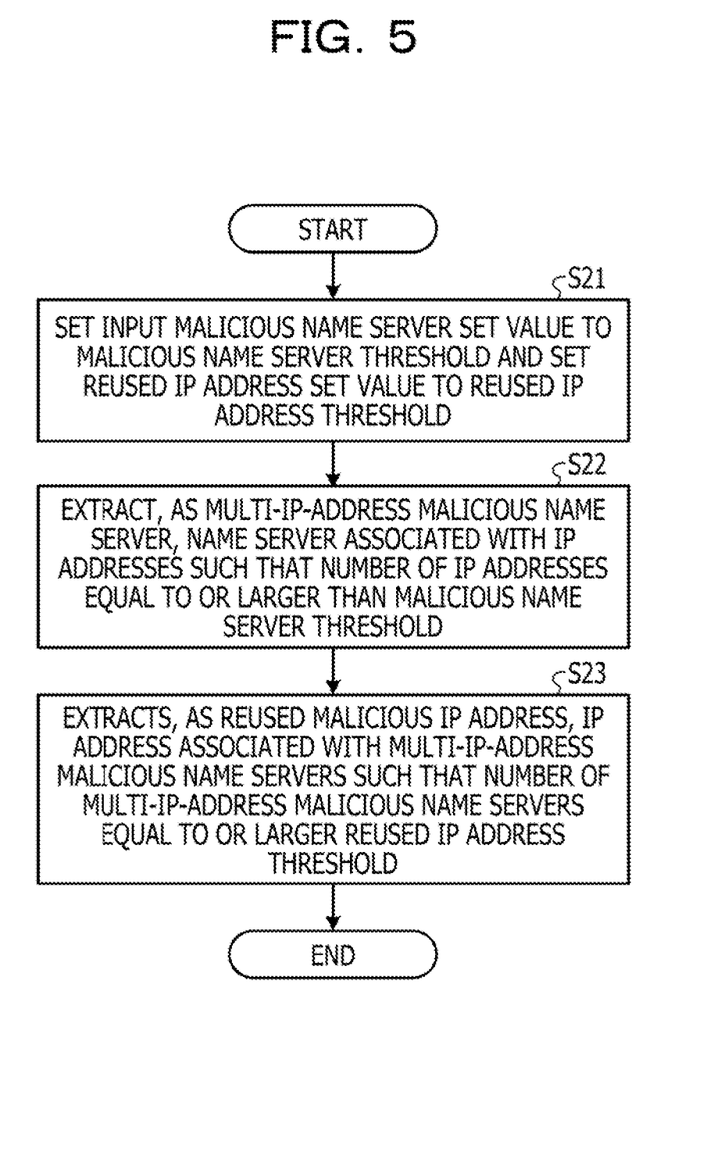
FIG. 5 is a flowchart illustrating an example of a malicious name server analysis process.

FIG. 5 is a flowchart illustrating an example of the malicious name server analysis process. As illustrated in FIG. 5, when the malicious name server analysis process is started, the analyzer 10 sets the malicious name server set value input as the setting information 12 to a malicious name server threshold and sets the reused IP address set value to a reused IP address threshold (S21).

The malicious name server set value and the reused IP address set value are values (thresholds) set in advance by a user or the like for analysis of a malicious name server and a reused IP address. By appropriately setting these values, the user may adjust conditions for the analysis of the malicious name server and the reused IP address.

The analyzer 10 references the name server information 13 and extracts, as a multi-IP-address malicious name server, a name server associated with IP addresses such that the number of IP addresses with which the name server is associated is equal to or larger than the malicious name server threshold (S22). Then, the analyzer 10 causes the information extracted in S22 to be stored in the malicious name server list information 21.

For example, the analyzer 10 uses data of "name servers" and "IP addresses" of the name server information 13 (refer to the lower part of FIG. 4) to count the number of IP addresses associated with each of the name servers. The analyzer 10 extracts information of a name server associated with counted IP addresses such that the number of counted IP addresses with which the name server is associated is equal to or larger than the malicious name server threshold.

In the example of the name server information 13 illustrated in the lower part of FIG. 4, for example, when the malicious name server threshold is set to "3", the analyzer 10 determines "ns1.malicious.com" as a malicious name server. The analyzer 10 extracts, from the name server information 13, "ns1.malicious.com" determined as the malicious name server and a group of IP addresses "a.a.a.a", "b.b.b.b", . . . associated with "ns1.malicious.com".

Figure 6:
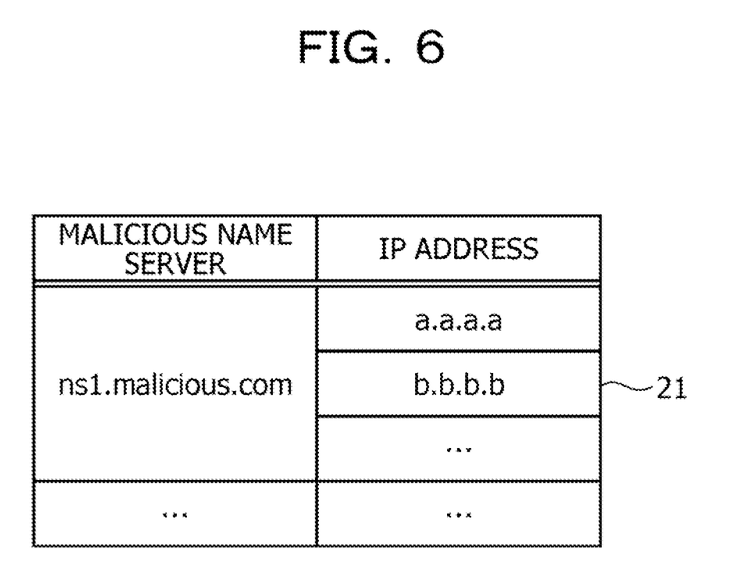
FIG. 6 is an explanatory diagram illustrating an example of malicious name server list information.

FIG. 6 is an explanatory diagram illustrating an example of the malicious name server list information 21. As illustrated in FIG. 6, the analyzer 10 causes the extracted "ns1.malicious.com" to be stored in a "malicious name server" column included in the malicious name server list information 21 and causes the group of IP addresses "a.a.a.a", "b.b.b.b", . . . associated with "ns1.malicious.com" to be stored in an "IP address" column included in the malicious name server list information 21.

In the example of the name server information 13 illustrated in the lower part of FIG. 4, when the malicious name server threshold is set to "3", "ns1.bad.com" is associated with only an IP address "c.c.c.c", and the analyzer 10 does not determine "ns1.bad.com," as a malicious name server. Therefore, "ns1.bad.com" and "c.c.c.c" associated with "ns1.bad.com" are not stored in the malicious name server list information 21. The analyzer 10 executes the foregoing process on all the name servers included in the name server information 13.

Return to FIG. 5. After S22, the analyzer 10 references the malicious name server list information 21 and extracts, as a reused malicious IP address, an IP address associated with multi-IP-address malicious name servers such that the number of multi-IP-address malicious name servers with which the IP address is associated is equal to or larger than the reused IP address threshold (S23). The analyzer 10 causes the information extracted in S23 to be stored in the reused IP address list information 22.

For example, the analyzer 10 uses the malicious name server list information 21 to search for an IP address stored in the "IP address" column and associated with a malicious name server. When an IP address is associated with malicious name servers such that the number of malicious name servers with which the IP address is associated is equal to or larger than the reused IP address threshold as a result of the search, the analyzer 10 determines the IP address as a reused malicious IP address. The analyzer 10 extracts, from the malicious name server list information 21, the IP address determined as the reused malicious IP address and the malicious name servers associated with the IP address.

Figure 7:
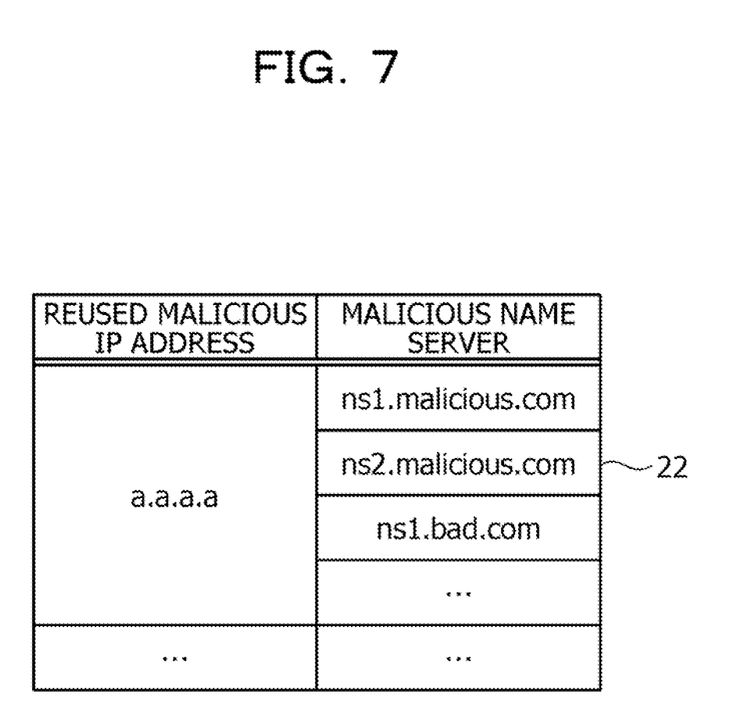
FIG. 7 is an explanatory diagram illustrating an example of reused IP address list information.

FIG. 7 is an explanatory diagram illustrating an example of the reused IP address list information 22. As illustrated in FIG. 7, the analyzer 10 causes the IP address extracted in S23 to be stored in a "reused IP address" column and causes the malicious name servers associated with the IP address to be stored in a "malicious name server" column.

For example, when the reused IP address threshold is set to "4", and the IP address "a.a.a.a" is reused by (or associated with) four or more malicious name servers "ns1.malicious.com", "ns2.malicious.com", "ns1.bad.com", . . . , the analyzer 10 determines "a.a.a.a" as a reused malicious IP address.

As illustrated in FIG. 7, the analyzer 10 causes "a.a.a.a" determined as the reused malicious IP address and the malicious name servers "ns1.malicious.com", "ns2.malicious.com", "ns1.bad.com", . . . associated with "a.a.a.a" to be stored in the reused IP address list information 22.

Return to FIG. 1. The storage section 20 is a storage device, such as a memory, and stores the malicious name server list information 21 and the reused IP address list information 22.

The detector 30 executes a malicious communication detection process (S3) of using, as input, the malicious name server list information 21 stored in the storage section 20, the reused IP address list information 22 stored in the storage section 20, and an input domain list 31 to detect malicious domains for name servers included in the input domain list 31.

For example, the detector 30 detects, as a malicious domain, a domain that is among domains included in the input domain list 31 and of which a name server corresponds to the malicious name server list information 21 or the reused IP address list information 22 or that is associated with an IP address corresponding to the malicious name server list information 21 or the reused IP address list information 22. The detector 30 outputs a detected malicious domain list 33 of the enumerated malicious domains detected from the input domain list 31 and a detected malicious name server list 32 of the enumerated name servers of the malicious domains. For example, the detected malicious domain list 33 and the detected malicious name server list 32 are an example of second list information.

Figure 8:
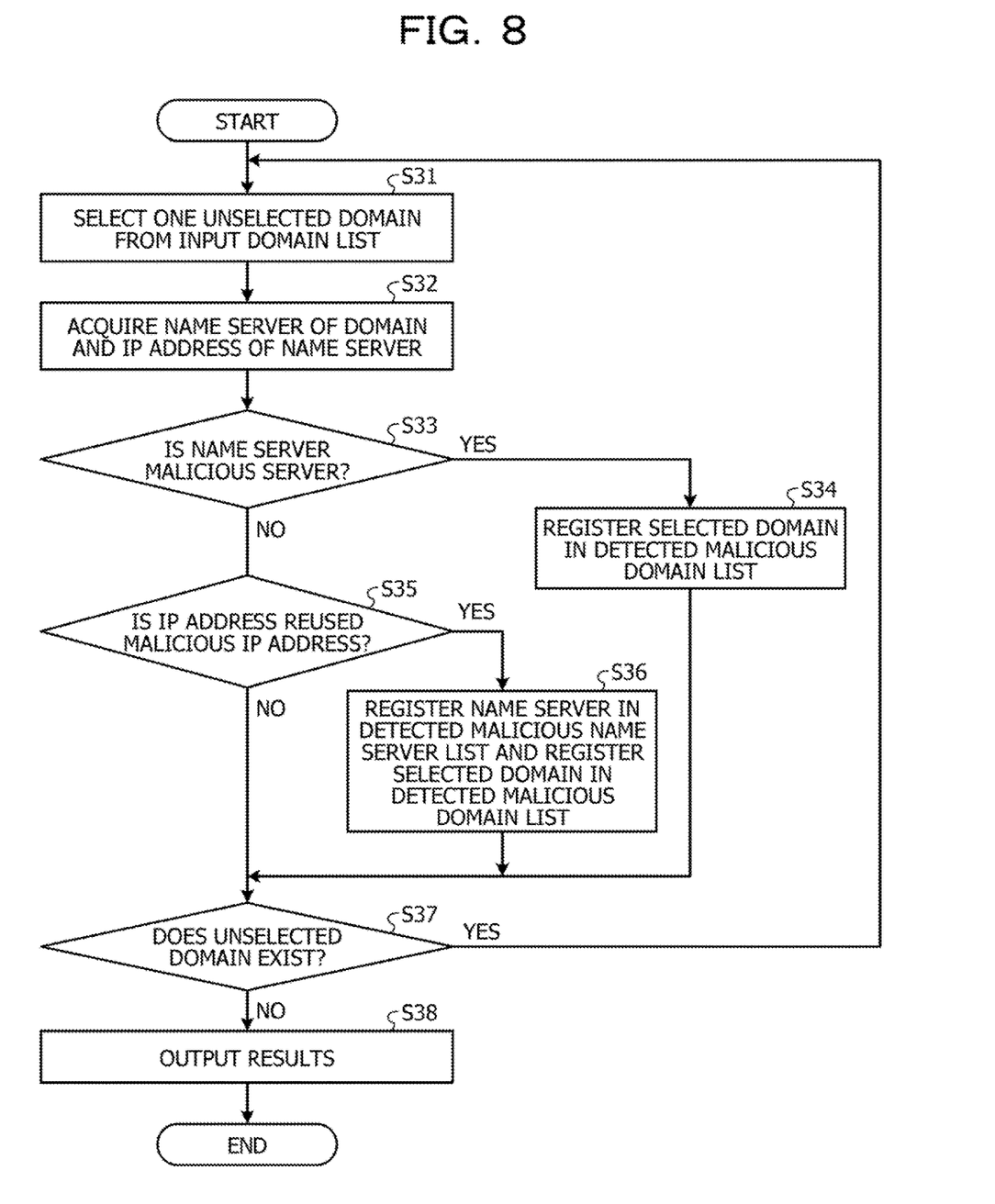
FIG. 8 is a flowchart illustrating an example of a malicious communication detection process.

FIG. 8 is a flowchart illustrating an example of the malicious communication detection process. As illustrated in FIG. 8, when the malicious communication detection process is started, the detector 30 selects one of unselected domains from the input domain list 31 (S31).

The detector 30 outputs a query to DNS3, and acquires a name server (NS record) of the selected domain and an IP address (A record) of the name server (that also outputs a query) (S32).

The detector 30 determines whether the name server of the selected domain is a malicious server by determining whether the name server corresponding to the malicious name server list information 21 exists (S33).

When the name server corresponding to the malicious name server list information 21 exists (Yes in S33), the detector 30 registers the selected domain in the detected malicious domain list 33 (S34) and causes the process to proceed to S37.

When the name server corresponding to the malicious name server list information 21 does not exist (No in S33), the detector 30 determines whether an IP address associated with the selected domain is a reused malicious IP address by determining whether the IP address, corresponding to the reused IP address list information 22, of the name server of the selected domain exists (S35).

When the IP address corresponding to the reused IP address list information 22 exists (Yes in S35), the detector 30 registers the selected domain in the detected malicious domain list 33, identifies the name server of the selected domain as a malicious name server, registers the name server of the selected domain in the detected malicious name server list 32 (S36), and causes the process to proceed to S37. When the IP address corresponding to the reused IP address list information 22 does not exist (No in S35), the detector 30 skips S36 and causes the process to proceed to S37.

The detector 30 determines whether an unselected domain exists in the input domain list 31 (S37). When the unselected domain exists (Yes in S37), the detector 30 causes the process to return to S31. When the unselected domain does not exist (No in S37), the detector 30 outputs results of processing the detected malicious name server list 32 and the detected malicious domain list 33 (S38) and terminates the process. The detector 30 adds a malicious name server not included in the malicious name server list information 21 of the storage section 20 to the malicious name server list information 21 based on the detected malicious name server list 32 to update the malicious name server list information 21.

Return to FIG. 1. The communication controller 40 is a processing section that executes communication access control (S4) by monitoring communication packets communicated via a communication interface and controlling passing and blocking of predetermined communication packets.

For example, the communication controller 40 blocks, based on the detected malicious name server list 32 and the detected malicious domain list 33, access (communication packet) to a communication destination that is an IP address associated with a domain corresponding to the detected malicious domain list 33 or with a name server corresponding to the detected malicious name server list 32. The communication controller 40 blocks access (communication packet) from a communication source that is an IP address associated with a domain corresponding to the detected malicious domain list 33 or with a name server corresponding to the detected malicious name server list 32.

As described above, the information processing device 1 acquires the malicious domain list 11 of the domain information included in cyber attack information, monitors communication of DNS3 for managing associations between the domain information and the IP addresses, and acquires record information corresponding to the acquired domain information from Passive DNS2 for managing answer histories of DNS3 that are related to the associations between the domain information and the IP addresses. The information processing device 1 analyzes the acquired domain information and the acquired record information and identifies an IP address repeatedly used and a name server associated with the IP address. The information processing device 1 outputs the malicious name server list information 21 indicating the identified IP address and the identified name server and the reused IP address list information 22.

Therefore, the user may easily identify attack infrastructure (malicious name server and IP address frequently used)

operated by an attacker. The user may handle a cyber attack by taking down the attack infrastructure identified in the foregoing manner.

The information processing device 1 outputs the detected malicious domain list 33 indicating a domain that is among domains included in the input domain list 31 and of which a name server corresponds to the malicious name server list information 21 or the reused IP address list information 22 or that is associated with an IP address corresponding to the malicious name server list information 21 or the reused IP address list information 22. The information processing device 1 outputs the detected malicious name server list 32 indicating a name server of the domain.

Therefore, the user may easily identify, from the input domain list 31, a malicious domain and a malicious name server that are operated by the attacker. The user may handle a cyber attack by taking down the identified malicious domain and the identified malicious name server.

The information processing device 1 blocks, based on the detected malicious name server list 32 and the detected malicious domain list 33, access to an IP address associated with the corresponding domain or with the corresponding name server and access from the IP address.

By blocking the access related to the malicious domain and the malicious name server that are operated by the attacker, the information processing device 1 may suppress careless coupling to the attack infrastructure operated by the attacker.

(Others)

The constituent components of the devices illustrated in the drawings may not be physically configured as illustrated in the drawings. For example, specific forms of the separation and integration of each of the devices are not limited to those illustrated in the drawings. All or some of the devices may be functionally or physically separated and integrated in an arbitrary unit based on various loads, usage statuses, and the like.

All or some of the various processing functions to be executed in the information processing device 1 may be executed by a central processing unit (CPU) (or a microcomputer, such as a microprocessor unit (MPU) or a microcontroller unit (MCU)). All or some of the various processing functions may be executed by a program analyzed and executed by the CPU (or the microcomputer, such as the MPU or the MCU) or by hardware using wired logic. The various processing functions to be executed in the information processing device 1 may be executed by causing a plurality of computers to collaborate with each other via cloud computing.

Figure 9:
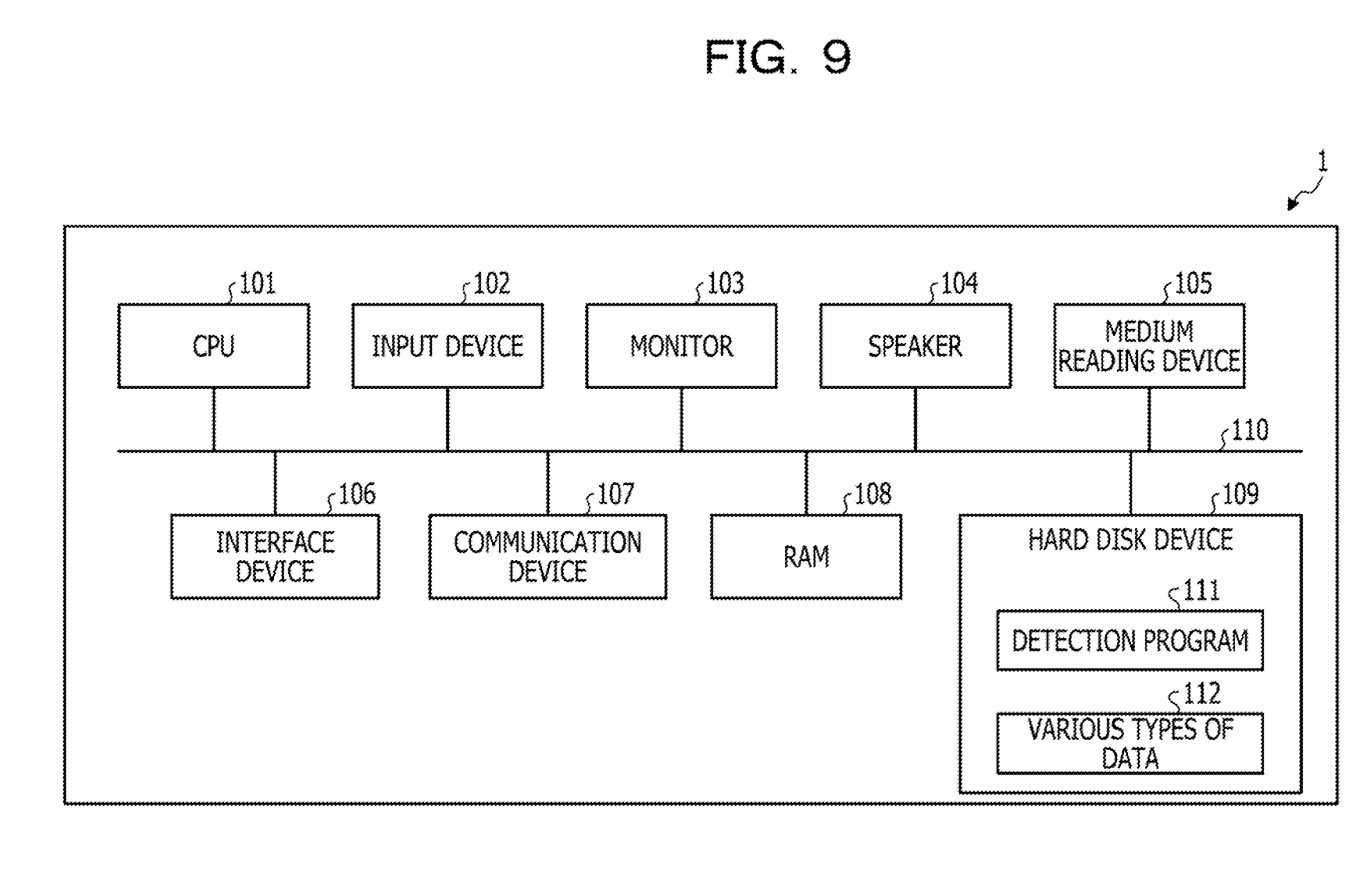
FIG. 9 is a block diagram illustrating an example of a hardware configuration of the information processing device according to the embodiment.

The various processes described in the embodiment may be achieved by causing a computer to execute a program prepared in advance. An example of the computer (hardware) that executes the program having the same functions as those described above in the embodiment is described below. FIG. 9 is a block diagram illustrating an example of a hardware configuration of the information processing device 1 according to the embodiment.

As illustrated in FIG. 9, the information processing device 1 includes a CPU 101 for executing various arithmetic processing, an input device 102 for receiving input data, a monitor 103, and a speaker 104. The information processing device 1 further includes a medium reading device 105 for reading the program and the like from a storage medium, an interface device 106 for coupling the information processing device 1 to various devices, and a communication device 107 that communicates with and is coupled to an external device via a cable or wirelessly. The information processing device 1 further includes a RAM 108 for temporarily storing various information, and a hard disk device 109. The units (101 to 109) included in the information processing device 1 are coupled to a bus 110.

In the hard disk device 109, a detection program 111 for executing the various processes, which are to be executed by the analyzer 10, the detector 30, the communication controller 40, and the like, is stored. The analyzer 10, the detector 30, the communication controller 40, and the like are described in the embodiment. In the hard disk device 109, various data 112 to be referenced by the detection program 111 is stored. The input device 102 receives input of operation information from an operator, for example. The monitor 103 displays various screens to be operated by the operator, for example. The interface device 106 is coupled to a printing device or the like, for example. The communication device 107 is coupled to a communication network, such as a local area network (LAN), and communicates various information with the external device via the communication network.

The CPU 101 reads the detection program 111 stored in the hard disk device 109, loads the detection program 111 into the RAM 108, and executes the detection program 111, thereby executing the processes related to the analyzer 10, the detector 30, the communication controller 40, and the like. The detection program 111 may not be stored in the hard disk device 109. For example, the information processing device 1 may read the detection program 111 stored in a storage medium readable by the information processing device 1 and execute the detection program 111. For example, the storage medium readable by the information processing device 1 corresponds to a portable recording medium, such as a compact disc read-only memory (CD-ROM) a Digital Versatile Disc (DVD), or a Universal Serial Bus (USB) memory, a semiconductor memory, such as a flash memory, a hard disk drive, or the like. The detection program 111 may be stored in a device coupled to a public line, the Internet, a LAN, or the like, and the information processing device 1 may read the detection program 111 from the device via the public line, the Internet, the LAN, or the like and execute the detection program 111.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention,

What is claimed is:

1. A non-transitory computer-readable storage medium storing a detection program that causes a processor included in a noise estimation apparatus to execute a process, the process comprising:
   acquiring domain information included in cyber attack information;
   acquiring record information corresponding to the acquired domain information from a second managing server, the second managing server managing a response history of a first managing server by monitoring communication of the first managing server, the first managing server managing an association between domain information and an IP address, the response history being related to the association between the domain information and the IP address;

identifying an IP address that is repeatedly used and a name server associated with the identified IP address by analyzing the record information;

generating first list information indicating the identified IP address and the identified name server;

selecting a domain from an input domain list;

acquiring a name server of the selected domain and an IP address of the name server of the selected domain;

determining whether the name server of the selected domain is included in second list information in the first list information; and determining, when the name server of the selected domain is not included in the second list information, whether the IP address of the name server of the selected domain is included in third list information in the first list information.

2. The non-transitory computer-readable storage medium according to claim 1, wherein the second list information includes malicious name servers and the third list information includes reused IP addresses.

3. The non-transitory computer-readable storage medium according to claim 1, wherein the process further comprising: blocking access to an IP address associated with the domain corresponding to the second list information or with the name server corresponding to the second list information, and blocking access from the IP address.

4. A detection method comprising:

acquiring domain information included in cyber attack information; acquiring record information corresponding to the acquired domain information from a second managing server, the second managing server managing a response history of a first managing server by monitoring communication of the first managing server, the first managing server managing an association between domain information and an IP address, the response history being related to the association between the domain information and the IP address;

identifying an IP address that is repeatedly used and a name server associated with the identified IP address by analyzing the record information;

generating first list information indicating the identified IP address and the identified name server;

selecting a domain from an input domain list;

acquiring a name server of the selected domain and an IP address of the name server of the selected domain;

determining whether the name server of the selected domain is included in second list information in the first list information; and determining, when the name server of the selected domain is not included in the second list information, whether the IP address of the name server of the selected domain is included in third list information in the first list information.

5. The detection method according to claim 4, wherein the second list information includes malicious name servers and the third list information includes reused IP addresses.

6. The detection method according to claim 4, further comprising: blocking access to an IP address associated with the domain corresponding to the second list information or with the name server corresponding to the second list information, and blocking access from the IP address.

7. An information processing device comprising:

a memory; and a processor coupled to the memory and configured to:

acquire domain information included in cyber attack information, acquire record information corresponding to the acquired domain information from a second managing server, the second managing server managing a response history of a first managing server by monitoring communication of the first managing server, the first managing server managing an association between domain information and an IP address, the response history being related to the association between the domain information and the IP address, identify an IP address that is repeatedly used and a name server associated with the identified IP address by analyzing the record information, generate first list information indicating the identified IP address and the identified name server, select a domain from an input domain list;

acquire a name server of the selected domain and an IP address of the name server of the selected domain;

determine whether the name server of the selected domain is included in second list information in the first list information; and determine, when the name server of the selected domain is not included in the second list information, whether the IP address of the name server of the selected domain is included in third list information in the first list information.

8. The information processing device according to claim 7, wherein the second list information includes malicious name servers and the third list information includes reused IP addresses.

9. The information processing device according to claim 7, wherein the processor blocks access to an IP address associated with the domain corresponding to the second list information or with the name server corresponding to the second list information, and blocks access from the IP address.

* * * * *